US005329441A

United States Patent [19]

Aoki et al.

[11] Patent Number: 5,329,441

[45] Date of Patent: Jul. 12, 1994

[54] HYDRAULIC CONTROL DEVICE FOR A WORK MACHINE

[75] Inventors: Kanji Aoki; Yukio Uchiyama; Toshiyuki Midorikawa, all of Sagamihara, Japan

[73] Assignees: Mitsubishi Jukogyo Kabushiki Kaisha, Tokyo; MHI Sagami High Technology & Control Engineering Co., Ltd., Kanagawa, both of Japan

[21] Appl. No.: 830,578

[22] Filed: Feb. 5, 1992

[30] Foreign Application Priority Data

Feb. 5, 1991 [JP] Japan .................................. 3-035338

[51] Int. Cl.⁵ ............................................ G06F 15/20

[52] U.S. Cl. .................................. 364/148; 187/29.2; 187/9 R

[58] Field of Search ............... 364/148, 152; 187/9 R, 187/29.2; 414/635; 123/339, 695, 396, 41.12; 60/443, 444

[56] References Cited

U.S. PATENT DOCUMENTS

| | | | |
|---|---|---|---|
| 4,187,546 | 2/1980 | Heffernan et al. | 364/565 |
| 4,510,750 | 4/1985 | Izumi et al. | 60/443 |
| 4,532,595 | 7/1985 | Wilhelm | 364/463 |
| 4,727,490 | 2/1988 | Narita et al. | 364/424.1 |
| 4,742,468 | 5/1988 | Ohashi et al. | 364/424 |
| 4,930,975 | 6/1990 | Ito | 414/635 |
| 5,165,377 | 11/1992 | Hosseini | 123/41.12 |
| 5,184,699 | 2/1993 | Aoki et al. | 187/9 R |

FOREIGN PATENT DOCUMENTS

| | | |
|---|---|---|
| 0158456 | 3/1985 | European Pat. Off. . |
| 2499053 | 2/1982 | France . |

OTHER PUBLICATIONS

Patent Abstract of Japan, vol. 15, No. 77 (M-1085), Feb. 22/91; & JP-A2300100 (Mitsubishi Heavy Ind Ltd), Dec. 12. 1990.

*Primary Examiner*—Jerry Smith
*Assistant Examiner*—C. H. Tousi
*Attorney, Agent, or Firm*—Nixon & Vanderhye

[57] ABSTRACT

A control device for hydraulic equipment where an oil pressure sensor provides an oil pressure output. The sensed pressure output is used in a table to derive a controlled variable limit which is then compared with a controlled variable input. The smaller of the input and limit are used to control hydraulic pressure supplied to the hydraulic oil line. However, also included is a correction device which adjusts the table depending upon whether the output is at a desired oil pressure value or not.

5 Claims, 8 Drawing Sheets

HYDRAULIC CONTROL DEVICE FOR A WORK MACHINE

FIELD OF THE INVENTION AND RELATED ART STATEMENT

This invention relates to a control device that has excellent response characteristic and ensures a constant lowering speed for work machines such as forklifts using electrohydraulic control.

Work machines, such as forklifts, for transporting cargoes, must ensure safety in operation because they are essentially used for loading/unloading and carrying cargoes. In tilting or raising/lowering the fork using a hydraulic cylinder, positioning and raising/lowering of cargoes must be performed securely. In carrying cargoes, the machine must be run with care to prevent cargoes from falling.

On the mechanical forklift, for example when the hydraulic cylinder in the lift direction (called a lift cylinder) is controlled, the manipulated variable of control lever is transmitted to a control valve via a mechanical linkage to control the degree of opening of this control valve. Thus, the quantity of oil in the lift cylinder is controlled to regulate the rising/lowering speed.

In this operation, the lift cylinder must be operated in such a manner as to prevent eargoes from falling. For this purpose, a flow control valve is usually installed to make the lowering speed constant. Nevertheless, this conventional configuration has poor response characteristic and does not ensure safety because sudden lowering occurs at the start of lowering operation and a shock is developed when the normal lowering speed is restored.

Recently, an electrohydraulic type forklift of finger touch operation has shown up to reduce the operating force. On the forklift of this type, the degree of opening of finger-touch lever is changed into an electric signal, which is processed by a controller to control a hydraulic drive circuit for controlling the hydraulic equipment.

OBJECT AND SUMMARY OF THE INVENTION

It is an object of this invention to provide a control device for work machine of the above-described electrohydraulic control type that has excellent response characteristic and ensures a constant lowering speed control.

It is another object of this invention to provide a control device for work machine that has excellent response characteristic and ensures accurate maximum lowering speed even when there are variations in an oil pressure sensor or the like.

It is a further object of this invention to provide a control device for work machine that ensures accurate maximum lowering speed even when the limit table is changed partially by load.

To attain the above objects, in a work machine on which a controller controls hydraulic equipment performing functions by the operation of work machine lever, according to this invention, a control device for the work machine is characterized by a controller which comprises a means for regulating the limit controlled variable in accordance with the oil pressure detected by a oil pressure sensor disposed in an oil pipe line in the hydraulic equipment when the controlled variable is output in accordance with the degree of opening of the work machine lever, and means for correcting the limit controlled variable by shifting the table of limit controlled variable so that said limit controlled variable agrees with the measured value.

In a preferred embodiment of this invention, when the limit controlled variable is corrected by shifting the table of limit controlled variable, a threshold value of a certain load is set, and the corrected value is changed in accordance with the decision result as to whether the load is larger than the threshold or not.

In another preferred embodiment of this invention, when the load is larger than the specified threshold value, the output value is the output of work machine lever, and when the load is smaller than the threshold, the output value is the load limit value plus/minus a corrected value.

According to the configuration of this invention, accurate control can be performed not only by obtaining the limit controlled variable corresponding to the maximum speed by the oil pressure detected by the oil pressure sensor disposed in the hydraulic circuit but also by correcting this limit controlled variable in accordance with the measured variations in pipe resistance and the like.

In addition, when the limit controlled variable is changed by load in a nonlinear mode, a threshold is set to divide the load for different correction, which enables further accurate control.

The result is that a control device has excellent response characteristic and ensures a constant maximum lowering speed.

DETAILED DESCRIPTION OF PREFERRED EMBODIMENTS

The embodiments of this invention will be described below with reference to the drawings.

Figure 7:
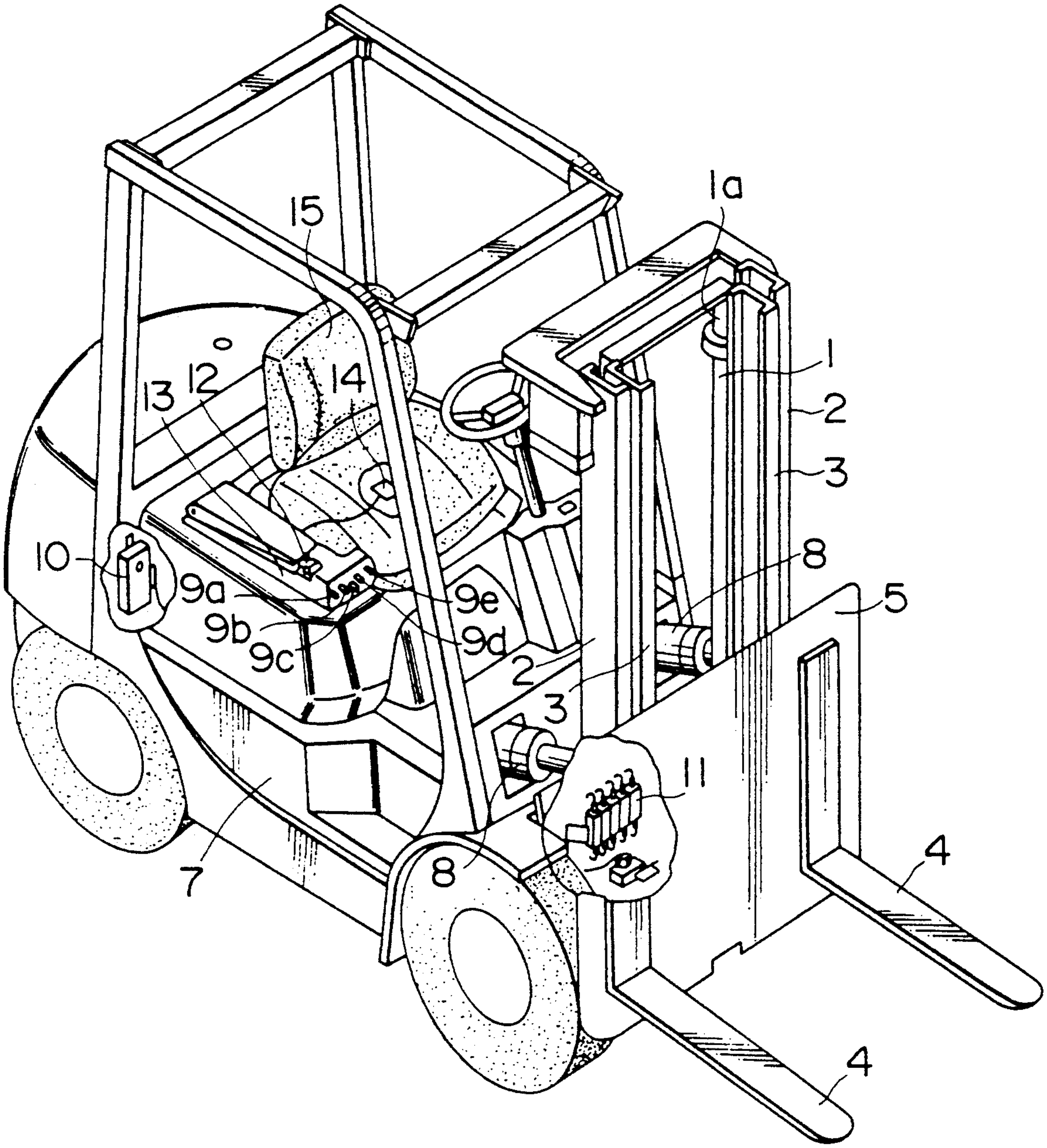
FIG. 7 is a general view of a forklift.

FIG. 7 is a perspective view of a typical forklift to which the embodiments of this invention are applied. As indicated in this figure, lift cylinders 1 are fixedly secured to a pair of right and left outer masts 2, so that a pair of right and left inner masts 3 are raised/lowered with the outer masts 2 being used as guides when piston rods 1*a* are extended or retracted. The outer masts 2 are fixed to the vehicle body 7 at the front part of the vehicle body 7. Therefore, a lift portion consisting of a bracket 5 depended from chains (not shown) and a fork 4 for directly carrying a cargo is raised/lowered as the inner masts 3 are raised/lowered.

Tilt cylinders 8 act to tilt the lift portion as well as the outer masts 2 and inner masts 3 forward (away from the vehicle body 7) or backward (toward the vehicle body 7). The lift portion is tilted forward when a cargo is unloaded, and backward when a cargo is lifted and carried so that respective workability is kept good and safety is ensured.

Work machine levers 9a, 9b are operated by the operator to control lift cylinders 1 and tilt cylinders 8 via a controller 10 and an electromagnetic proportional control valve 11. These levers are housed in a joy stick box 13 together with a safety switch 12 for emergency stop. Work machine levers 9c, 9d, 9e are spare levers for various attachments. A seat switch 14 is activated when the operator is seated on the operator's seat 15, whose output signal is sent to the controller 10.

Figure 8:
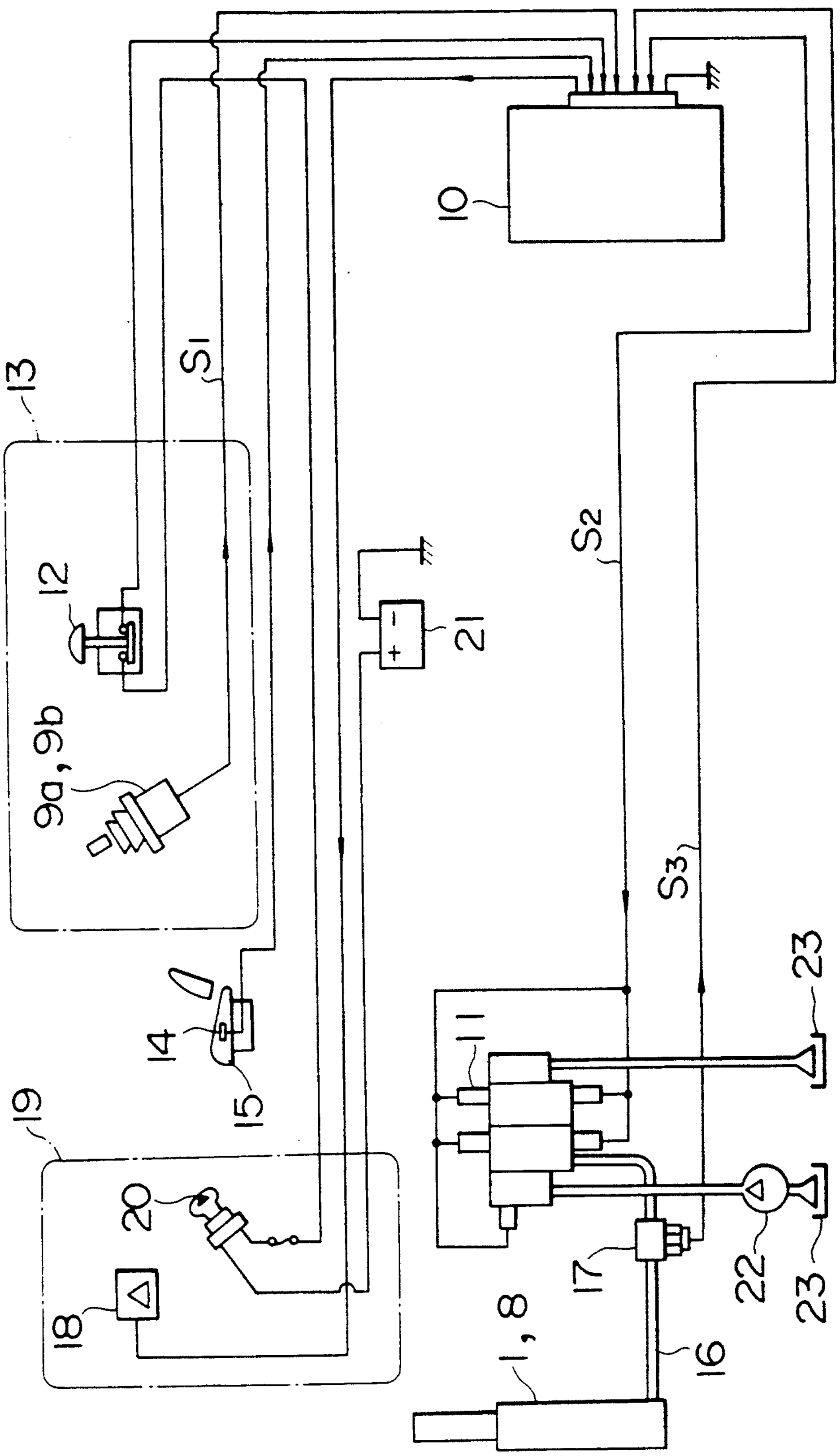
FIG. 8 is a control circuit diagram of a forklift.

FIG. 8 is a circuit diagram of a typical control device for the above-described forklift. In this figure, the same reference numerals are applied to the same elements as those in FIG. 7, and the repeated explanation is omitted.

The work machine lever 9a, 9b, consisting of a potentiometer, sends a lever manipulation signal $S_1$, in which the current value is proportional to the manipulated variable, to the controller 10 as shown in FIG. 8. The controller 10 sends a flow control signal $S_2$, which controls the degree of opening of spool in the electromagnetic proportional control valve 11 in accordance with the lever manipulation signal $S_1$. The electromagnetic proportional control valve 11 controls the flow of oil in an oil pipe line 16 owing to its spool moving in proportion to the magnitude of flow control signal $S_2$, so that the working speeds of lift cylinders 1 and tilt cylinders 8 are controlled in response to the manipulated variable of work machine lever 9a, 9b.

An oil pressure sensor 17 is disposed in the oil pipe line 16 to send an oil pressure signal $S_3$ representing the pressure of oil in this oil pipe line 16. The controller 10 processes the oil pressure signal $S_3$ and performs operations on the limit controlled variable acting on the lift cylinders 1 and tilt cylinders 8.

In addition, the controller 10 is activated by electric power supplied by a battery 21 then a starter switch 20 housed in a console box 19 together with a warning lamp 18 is turned on. When the safety switch 12 is on and the seat switch 14 is off, the controller 10 carries out control in such a manner that the current value of the flow control signal $S_2$ is zero and the degree of opening of the electromagnetic proportional control valve 11 is zero. That is, it keeps the positions of lift cylinders 1 and tilt cylinders 8 as they are.

In FIG. 8, reference numeral 22 denotes a hydraulic pump, and 23 denotes a hydraulic oil source. The number of components of hydraulic system such as the electromagnetic proportional control valve 11, the oil pipe line 16, and the oil pressure sensor 17 corresponds to the number of the work machine levers 9a through 9e. In this embodiment, two hydraulic systems are installed since the machine has two work machine levers 9a, 9b for raising/lowering and tilting.

Figure 1:
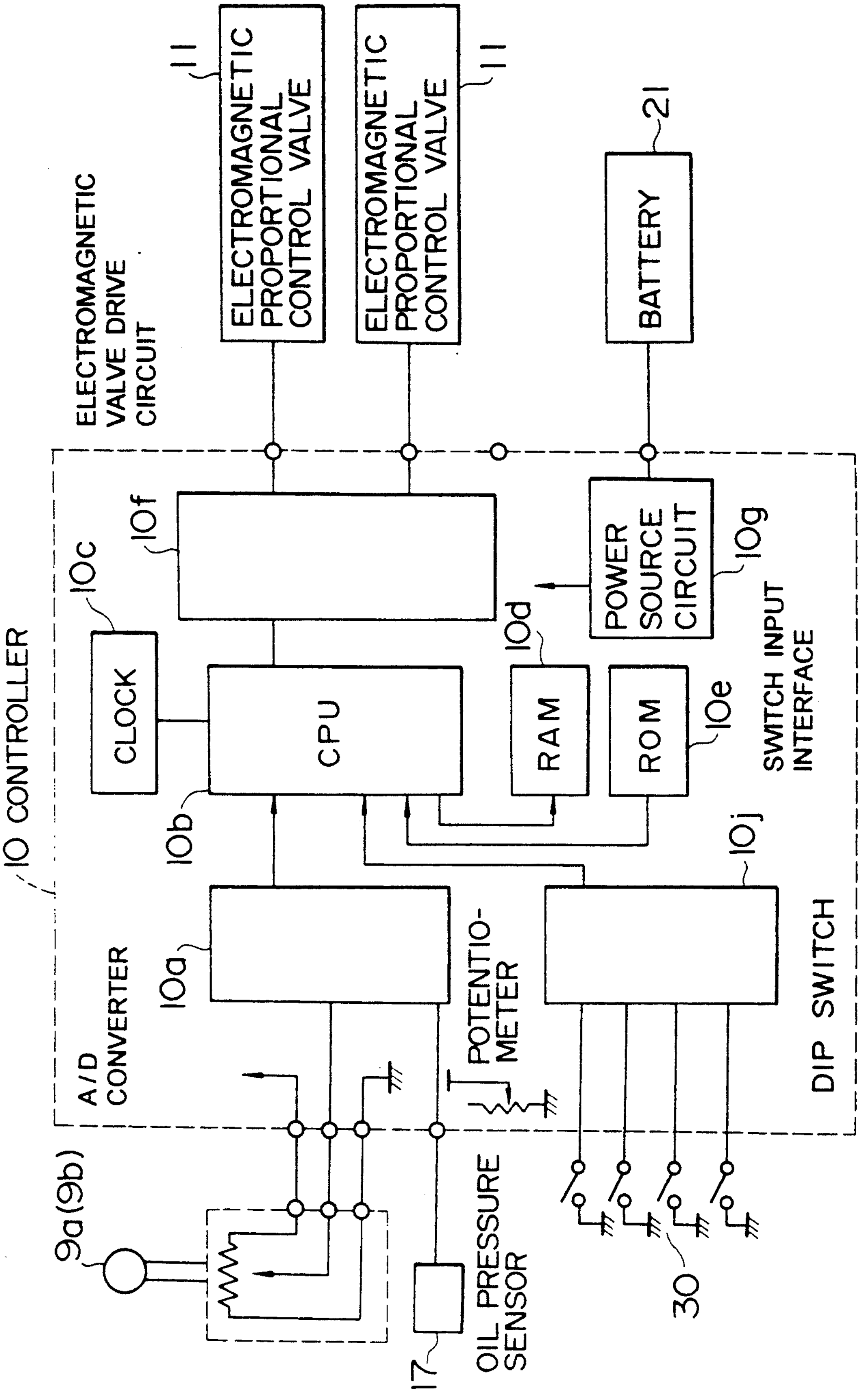
FIG. 1 is a block diagram showing a control device of an embodiment of this invention.

FIG. 1 is a block diagram showing the control circuit of main portion of this embodiment. As shown in FIGS. 7 and 8, the controller 10 is connected to the work machine levers 9a, 9b, and also connected to the electromagnetic control valves 11 which operate the lift cylinders 1 and tilt cylinders 8. The controller is also connected to switches 30, which are the input devices for the controller.

The controller 10 contains an A/D converter 10a for A/D converting the lever manipulation signal $S_1$ supplied from the work machine levers 9a, 9b, a central processing unit (CPU) 10b which is the heart of the controller 10, a clock 10c for governing the timing of CPU 10b, RAM 10d, ROM 10e, an electromagnetic valve drive circuit 10f, a power source circuit 10g, and a switch input interface 10j for switches 30.

Figure 2:
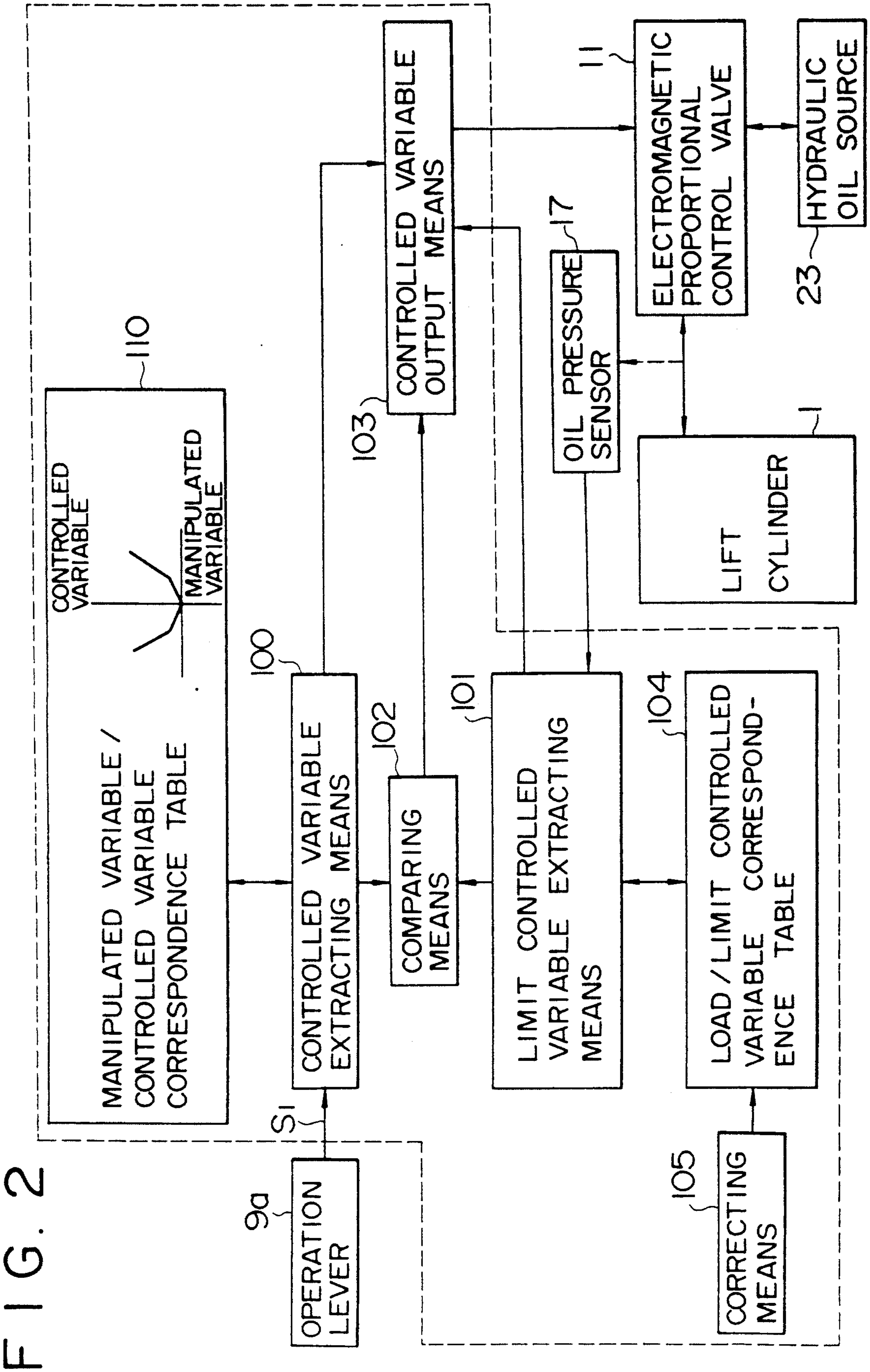
FIG. 2 is a block diagram mainly showing the control system of the control device.

FIG. 2 shows the processing system of the controller 10 particularly including RAM 10d and ROM 10e in the control circuit shown in FIG. 1. When the work machine lever 9a is manipulated with the seat switch 14 being on and the safety switch 12 being off, the manipulation signal $S_1$ is input to a controlled variable extracting means 100, in which a controlled variable corresponding to the manipulation signal $S_1$ is extracted from a manipulated variable/controlled variable correspondence table 110 stored in the RAM 10d or ROM 10e. On the other hand, a limit controlled variable is extracted from a limit controlled variable extracting means 101 in accordance with the oil pressure in the hydraulic circuit detected by the oil pressure sensor 17.

A comparing means 102 compares the extracted limit controlled variable with the controlled variable corresponding to the output of work machine lever which is supplied from the controlled variable extracting means, and a comparison signal representing which is larger between them is sent to a controlled variable output means 103.

The controlled variable output means acts in such a manner that when the controlled variable from the lever is larger than the limit controlled variable, the limit controlled variable is output, and conversely when the controlled variable from the lever is smaller than the limit controlled variable, the controlled variable from the lever is output.

Thus, the controlled variable of work machine lever 9a up to the maximum limit controlled variable is input to the electromagnetic proportional control valve 11.

Figure 3:
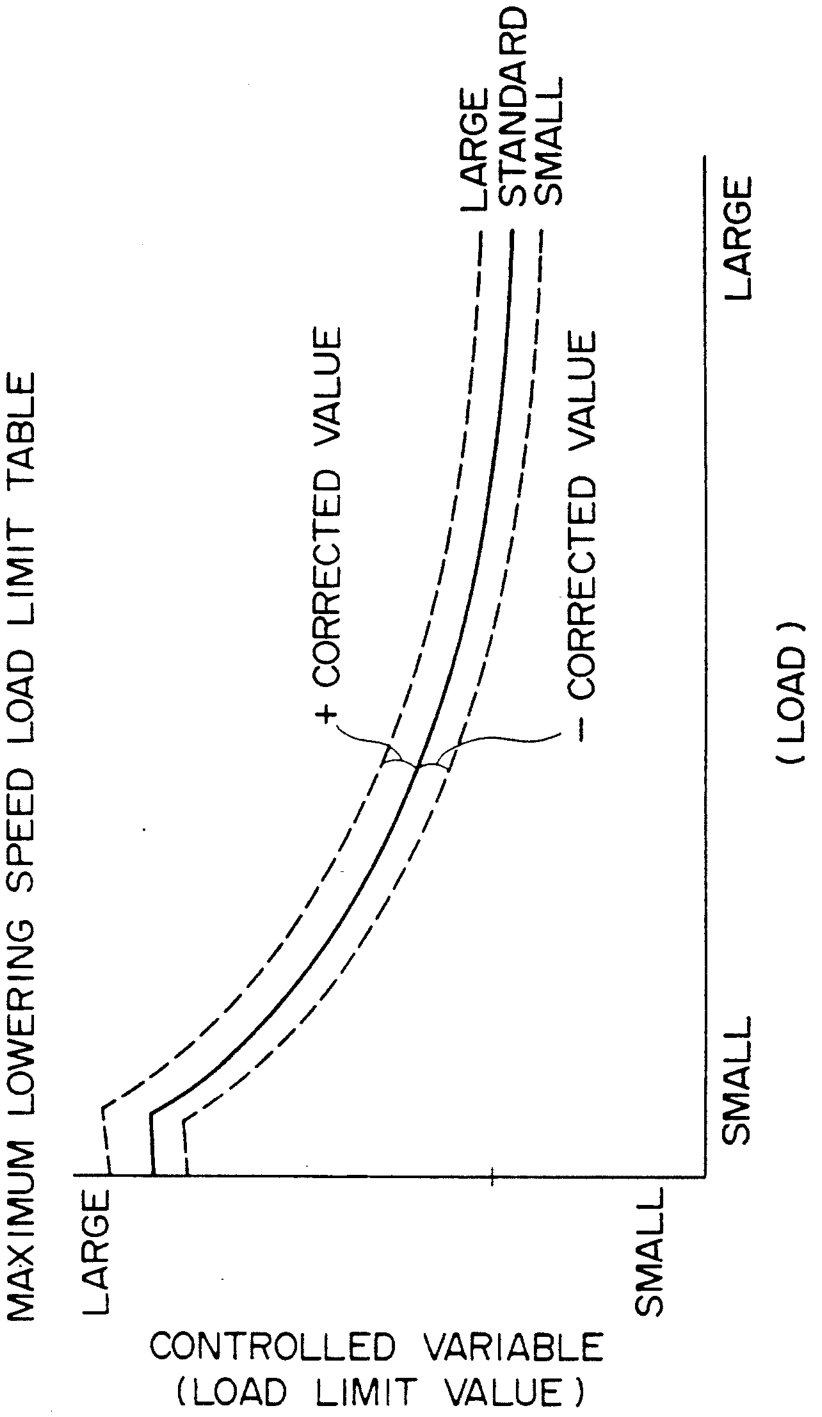
FIG. 3 is a characteristic diagram showing the relationship between controlled variable and load, which is a limit table.

Regarding the limit controlled variable extracting means 101 operated in accordance with the oil pressure detected by the oil pressure sensor 17, the limit controlled variable is extracted from a load/limit controlled variable correspondence table stored in the ROM 10e, but this table is obtained as the standard characteristic of limit controlled variable in relation to the load as shown by the solid line in FIG. 3. Therefore, if a load corresponding to the oil pressure detected by the oil pressure sensor 17 is determined, a certain value of limit controlled variable is specified.

However, even if the electromagnetic proportional control valve 11 is controlled by the limit controlled variable, a constant lowering speed cannot be obtained by this limit controlled variable only, because there are variations in pipe resistance and the like. Therefore, correction is needed to obtain the standard limit controlled variable in FIG. 3. A correcting means 105 measures the maximum lowering speed in relation to the load, and makes correction when the measured value is not on the solid line in FIG. 3; it moves the table shown in FIG. 3 up or down (+/−) so that the table is positioned in the standard characteristic.

In measuring the loitering speed, the maximum lowering speed is obtained by a plurality of loads (for example, loads of two different weights). Depending on whether the limit value based on this speed is above or below the standard characteristic curve in FIG. 3, a decision is made as to whether the actual value has the characteristic indicated by the broken line above or below the standard characteristic line, and also as to how much the actual value deviates from the standard characteristic line. The deviation obtained from actual measurement provides a characteristic that shifts the standard characteristic line in parallel and has a substantially same slope as the standard characteristic line (parallelism). The correction consists of parallel shift of table to the standard characteristic.

For correction, a plurality of switches 30 corresponding to the deviation are disposed on the switch input interface as shown in FIG. 1 to obtain appropriate corrected value by the input of the switch 30. These switches are operated actually by turning dial or adjusting potentiometer to obtain corrected value by a digital or analog means.

Figure 4:
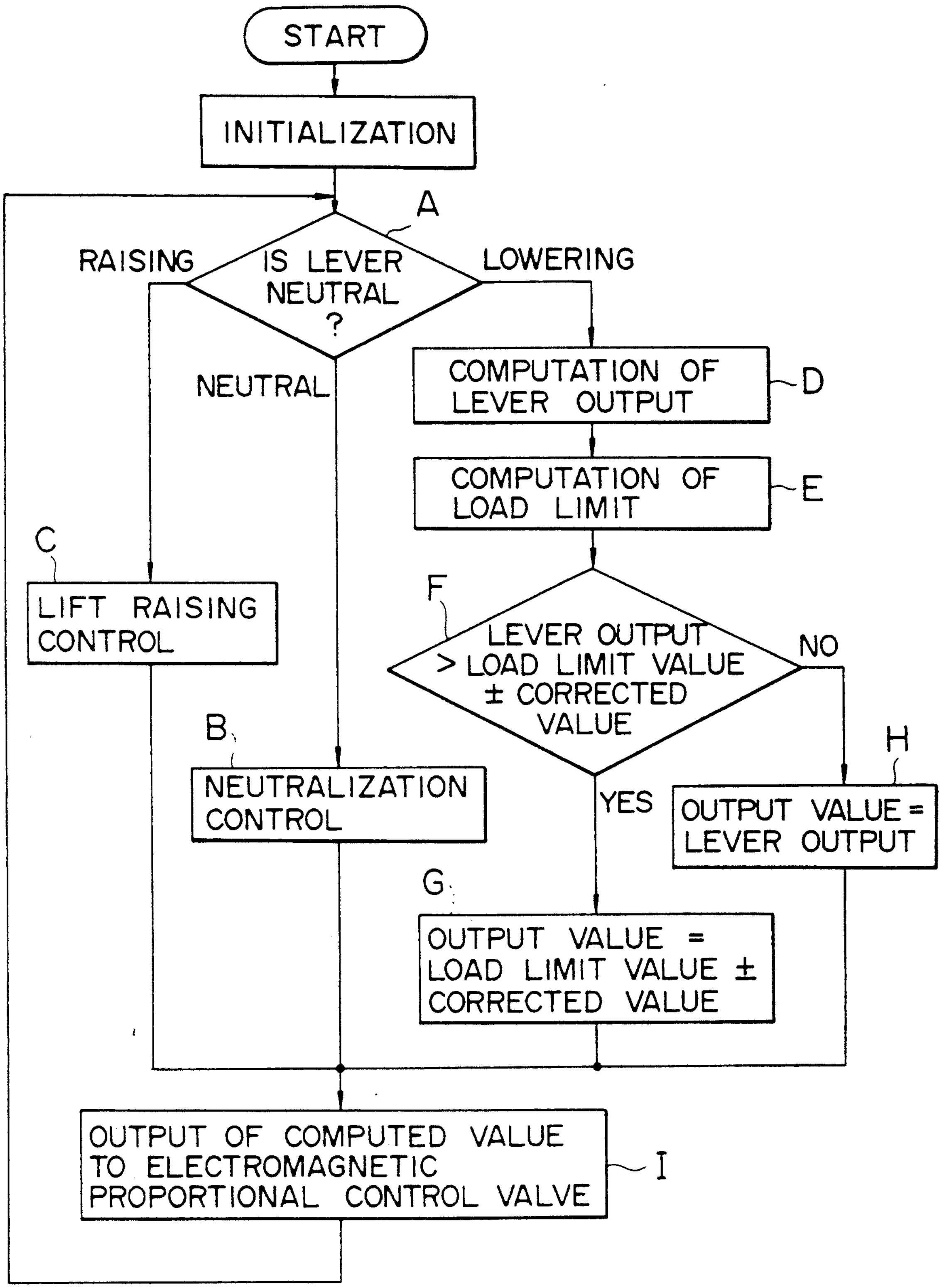
FIG. 4 is a flowchart of an example based on FIG. 3.

FIG. 4 is a control flowchart. After initialization is performed by the program start, a decision is made in Block A as to whether the work machine lever is neutral or not. In this case, the neutral position corresponds to zero output value to the electromagnetic proportional control valve 11; it means the status in which the ports of the electromagnetic proportional control valve 11 are closed and the lift cylinders 1 keep their positions. When the work machine lever is in the neutral position, the neutralization control is performed in the controller 10 (Block B), and the cylinders 1 are kept in their positions.

When the work machine lever is in the raising position in Block A, the lift raising control is performed in Block C.

When the work machine lever is in the lowering position in Block A, the controlled variable corresponding to the degree of opening of work machine lever is computed as the ever output (Block D). In Block E, the limit controlled variable corresponding to the load is computed. If the measured value has a deviation, correction is made so that the table has the standard characteristic.

In Block F, a decision is made as to whether the lever output is larger than the load limit value +/− corrected value. When the lever output is larger, the load limit value +/− corrected value is output (Block G). In the reverse case, the lever output is output (Block H). The output of Blocks C, B, G, and H is sent to the electromagnetic proportional control valve 11 (Block I).

In the correction shown in FIG. 3, there is a characteristic of the same slope (parallelism) between the standard characteristic line and the measured value, so all to do is a parallel shift of correction table.

Figure 5:
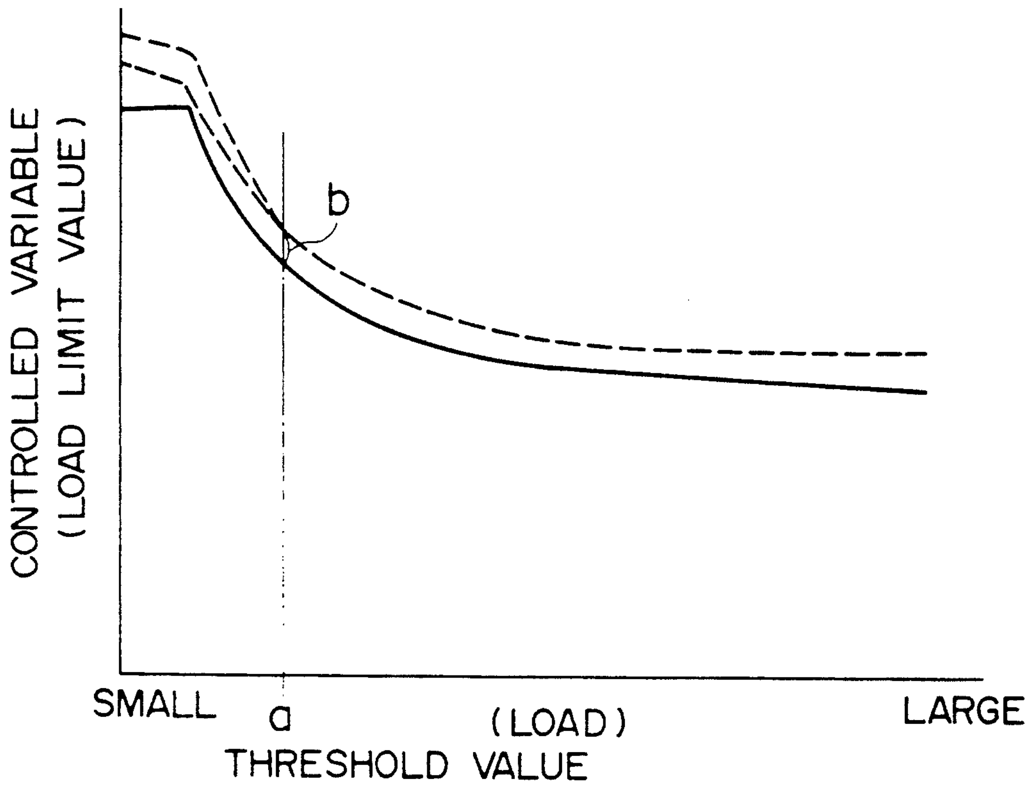
FIG. 5 is a characteristic diagram showing the relationship between controlled variable and load, which is a partially nonlinear limit table.

However, there is sometimes a case in which the parallelism is not exhibited for some load. In the low load range, the variations in oil pressure sensor, valve, controller, etc. have a large effect, so that nonlinear characteristic, which does not show parallelism, may occur. FIG. 5 shows such a characteristic; at the left side of the threshold value a, the corrected value shows nonlinear form as indicated by the broken line, and for example, the line is divided into two lines.

In this case, when the load is larger than the threshold a, correction is made by shifting the table on the basis of parallelism, and when the load is smaller than the threshold a, correction is made by adding or subtracting the nonlinear corrected value to obtain the standard characteristic.

Figure 6:
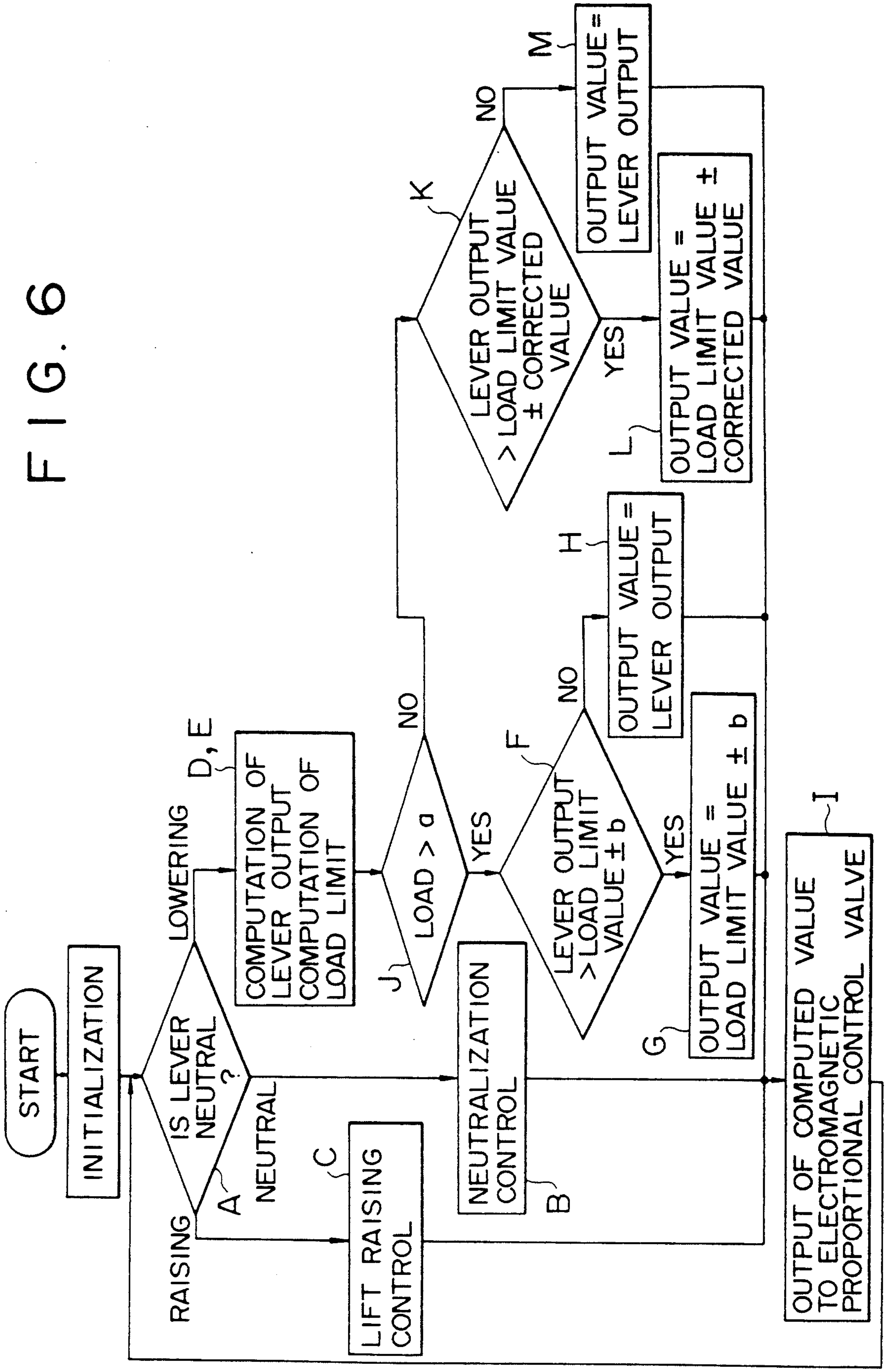
FIG. 6 is a flowchart of another example based on FIG. 5.

For this purpose, a decision block J is inserted in FIG. 4 to decide whether the load is larger than a or not as shown in FIG. 6. When the load is not larger than the threshold a, the flow goes to Block K, where a decision is made as to whether the load limit value to which nonlinear correction is added is smaller than the lever output or not. If the answer is yes, the load limit value + nonlinear correction is output (Block L). If the answer is no, the lever output becomes the output value (Block M).

The quantity of nonlinear correction is also determined from actual measurement. For example, when the corrected value of lowering speed at threshold a is taken as b, the corrected value is expressed as $$(a-x)K+b$$

where, a is a threshold load, x is a measured load, and K is a correction factor.

As described above, the limit controlled variable is corrected by shifting the whole of limit table even when there are variations in pressure sensor or the like, so that the control device of this invention has excellent response characteristic and ensures accurate maximum lowering speed. However, even when the limit table is partially changed by load, a threshold is set and nonlinear correction is partially made, so that further accurate maximum lowering speed can be obtained.

We claim:

1. A control device for hydraulic equipment where an operator manipulates the control device, said hydraulic equipment including at least one hydraulic cylinder for performing a desired function, said cylinder supplied with pressurized oil by an oil line, said device comprising:

a work machine lever, manipulated by the operator, for providing an input controlled variable output;

an oil pressure sensor means, responsive to oil pressure in said oil line, for providing an oil pressure output indicative of the load on the hydraulic cylinder;

table means for storing a limit for each of a plurality of oil pressures, and, responsive to said oil pressure output, for providing a limit controlled variable output;

a controlled variable output means, responsive to said limit controlled output and said input controlled variable output, for providing the smaller of said input controlled variable output and said limit controlled variable output to said hydraulic equipment and thereby controlling pressurized oil supplied to said oil line; and means for shifting said table means such that said limit controlled variable output insures a desired maximum speed of operation of said hydraulic cylinder.

2. The control device according to claim 1, wherein said cylinder is used to lower a structure and said speed of operation is the speed of lowering the structure.

3. The control device according to claim 2, wherein said controlled variable means is responsive to said oil pressure output indicative of a load, and if said load is above a threshold value, the controlled variable output means output comprises the input controlled variable and if said load is below a threshold value the controlled variable output means output comprises a load limit value pus a corrected value from said shifting means.

4. A control device for hydraulically operated forklift equipment where an operator manipulates the control device, said forklift including at least one hydraulic cylinder for lifting and lowering a load, said cylinder supplied with pressurized oil by an oil line, said device for limiting the lowering speed of said load, said device comprising:

a work machine lever, manipulated by the operator, for providing an input controlled variable output for lowering said load;

an oil pressure sensor means, responsive to oil pressure in said oil line, for providing an oil pressure output indicative of the load on the hydraulic cylinder;

table means for storing a limit for each of a plurality of oil pressures, and, responsive to said oil pressure output, for providing a limit controlled variable output; and a controlled variable output means for comparing said limit controlled variable output and said input controlled variable output and for providing the smaller of said input controlled variable output and said limit controlled variable output to said hydraulic cylinder and thereby controlling the lowering speed of the load.

5. A control device for hydraulically operated forklift equipment where an operator manipulates the control device, said forklift including at least one hydraulic cylinder for lifting and lowering a load, said cylinder supplied with pressurized oil by an oil line, said device for limiting the lowering speed of said load, said device comprising:

a work machine lever, manipulated by the operator, for providing an input controlled variable output for lowering said load;

an oil pressure sensor means, responsive to oil pressure in said oil line, for providing an oil pressure output indicative of the load on the hydraulic cylinder;

comparison means, responsive to said oil pressure sensor means, for providing an output indicative of said load being grater than a threshold value a;

table means for storing a limit for each of a plurality of oil pressures, and, responsive to said oil pressure output, for providing a limit controlled variable output;

a first controlled variable output means, responsive to said output indicative of said load not being greater than said threshold value a, for comparing said limit controlled variable output and said input controlled variable output and for providing the smaller of said input controlled variable output and said limit controlled variable output to said hydraulic cylinder and thereby controlling the lowering speed of the load; and a second controlled variable output means, responsive to said output indicative of said load being greater than said threshold value a, for providing said input controlled variable output to said hydraulic cylinder if said input controlled variable output is less than a corrected load limit value and, responsive to said output indicative of said load being less than said threshold value a, for providing said corrected load limit value to said hydraulic cylinder if said input controlled variable output is greater than a corrected load limit value.

* * * * *